US011439961B2

(12) United States Patent
Lehmann

(10) Patent No.: US 11,439,961 B2
(45) Date of Patent: Sep. 13, 2022

(54) CONTINUOUS MULTI-CHAMBER PROCESS

(71) Applicant: Markus Lehmann, Wohlen (CH)

(72) Inventor: Markus Lehmann, Wohlen (CH)

( * ) Notice: Subject to any disclaimer, the term of this patent is extended or adjusted under 35 U.S.C. 154(b) by 435 days.

(21) Appl. No.: 16/233,226

(22) Filed: Dec. 27, 2018

(65) Prior Publication Data

US 2020/0206702 A1 Jul. 2, 2020
US 2021/0205768 A9 Jul. 8, 2021

Related U.S. Application Data

(63) Continuation of application No. PCT/EP2016/065123, filed on Jun. 29, 2016.

(51) Int. Cl.
*B22C 5/00* (2006.01)
*B01F 25/90* (2022.01)
*B01J 4/00* (2006.01)
*F26B 25/00* (2006.01)

(52) U.S. Cl.
CPC ............... *B01F 25/901* (2022.01); *B01J 4/00* (2013.01); *F26B 25/002* (2013.01)

(58) Field of Classification Search
CPC .......... F27B 21/06; C22B 1/20; F26B 25/002; F26B 25/00
See application file for complete search history.

(56) References Cited

U.S. PATENT DOCUMENTS 2,174,066 A * 9/1939 Ahlmann ............... C04B 7/4461
432/7
2,876,489 A * 3/1959 McDowell ............. B01F 33/26
266/178
3,042,390 A * 7/1962 Rausch ..................... C22B 1/20
266/179
8,434,241 B2 5/2013 Lehmann et al.
2015/0135899 A1* 5/2015 Hauzenberger ........... F27D 1/18
75/448

FOREIGN PATENT DOCUMENTS

DE 101 48 721 4/2003

OTHER PUBLICATIONS

International Search Report, PCT/EP2016/065123, dated May 1, 2017, 2 Pages.

* cited by examiner

*Primary Examiner* — Anshu Bhatia
*Assistant Examiner* — Gregory Y Huan
(74) *Attorney, Agent, or Firm* — Paul D. Bianco; Jeffrey N. Giunta; Fleit Intellectual Property Law

(57) ABSTRACT

An installation for carrying out a continuous multi-stage industrial process includes a housing that defines a first space and a second space that is connected to the first through a first connecting channel. Different pressure conditions prevail in these spaces during the course of the process. A process material is passed sequentially through the first space, the first connecting channel and the second space. A transported material is provided in the first connecting channel to form a free-flowing sealing zone with the process material and ensures that different process conditions will be maintained in the two spaces, and in particular that different pressures will be maintained in the two spaces. The invention also relates to a multi-stage continuous industrial process using such an installation.

18 Claims, 1 Drawing Sheet

CONTINUOUS MULTI-CHAMBER PROCESS

CROSS-REFERENCE TO RELATED APPLICATIONS

This application claims priority to International Application Serial No. PCT/EP2016/065123 filed Jul. 13, 2017. International Application Serial No. PCT/EP2016/065123 is hereby incorporated herein in its entirety for all purposes by this reference.

FIELD OF THE INVENTION

The invention relates to an installation for carrying out a continuous multi-stage industrial process, comprising at least one first space and one second space, such that different process conditions and different pressures in particular prevail in these spaces during the course of the process, wherein these two spaces are connected to one another by a first connecting channel, and wherein a process material passes through the first space, the first connecting channel and the second space, one after the other, in a process sequence. The invention also relates to a continuous process that can be carried out on such an installation.

BACKGROUND OF THE INVENTION

Installations for carrying out industrial processes are known, but they usually consist of valves, flaps and/or airlocks, which are responsible for maintaining the various process conditions in the individual process spaces. One disadvantage to this is that such processes usually cannot be carried out continuously but instead must be carried out in so-called batches.

Industrial processes which are carried out continuously in different process spaces, in which the process material is free-flowing or free-flowing, usually do not allow different process conditions such as differences in pressure or temperature.

One example is given in (WO2008122137 A1) U.S. Pat. No. 8,434,241, which is hereby incorporated herein by this reference for all purposes, in which a wet pasty material, in particular a sludge, is dried in a drying process, by putting the wet material through a drying operation. This process is carried out in a drying tank, in which optimized pressure and temperature conditions prevail. As soon as the wet material has reached the desired degree of drying, an airlock is opened and the dry material can be removed. Next, additional wet material is introduced into the drying tank by means of a conveyor screw. To improve the process, the wet material may first be mixed with a dry substance and/or preheated. One disadvantage of this method is that the process cannot be carried out as a continuous process or without airlocks.

U.S. Pat. No. 2,174,006, which is hereby incorporated herein by this reference for all purposes, describes a continuous process for sintering or calcination, wherein the process material passes through various spaces on a conveyor belt, where it is heated, for example, and later cooled. However, the chambers are mostly made up of partitions, which are arranged at a sufficiently great distance from the conveyor belt, so that different pressure conditions cannot be set in the chambers.

DE10148721A1 describes a method for producing elastomer blends for production of rubber. The materials used to do so are fluid media. They are supplied in batches as needed through various metering scales.

BRIEF OBJECTS AND SUMMARY OF THE INVENTION

The object of the present invention is therefore to present an installation such as that described in the introduction, with which a continuous industrial process that can be carried out continuously is possible. Furthermore, a process that can be carried out continuously with such an installation is also to be described. It should also be possible to maintain the different pressures prevailing in the spaces.

These objects are achieved by the features of the independent patent claims. Preferred embodiments are described in the dependent claims. According to the invention, with such an installation, a transported material is provided in the first connecting channel in which or with which the process material can pass through the first connecting channel in a process sequence, wherein the transported material forms together with the process material a free-flowing sealing zone in the connecting channel, which ensures that the different process conditions will be maintained, in particular different pressures in the two spaces.

Accordingly, with the method according to the invention, process material is introduced into the first space with the first process conditions in the process according to the invention, where it is put through a first process, wherein the process material then passes through the first connecting channel in or together with the transported material and enters the second space under the second process conditions, where it is subjected to a second process, from which it is removed. The second process conditions in the second space differ from the first process conditions in the first space at least in the prevailing pressure.

The transported material together with the process material according to the invention forms a free-flowing sealing zone in the connecting channel, which ensures that the wide variety of process conditions will be maintained, in particular the pressure differences in the two spaces.

It has been found that a free-flowing and trickling mixture of process material and transported material may readily form a sealing zone in the connecting channel if the connecting channel is filled with this mixture over a sufficiently long distance. The connecting channel may be a pipe standing upright or obliquely, for example, and having a lower, narrower opening, out of which the mixture can trickle steadily while it is being replenished again repeatedly with the mixture, wherein the filling level of the pipe should preferably be within a predefined range. On the one hand, this can be regulated through the filling rate and, on the other hand, with the trickle rate, which can be determined by the cross-sectional area of the lower opening and/or by the geometry of the outlet region, for example.

According to the invention, the sealing zone in the multi-chamber process is created by a labyrinth seal, because a trickling mixture cannot form an absolutely airtight sealing zone and therefore allows a certain gas exchange between the two ends of the connecting channel. The required seal is achieved by an adequate length of the sealing zone accordingly, so that the process conditions in the two spaces adjacent to the connecting channels, in particular the pressure difference, are upheld to the extent required by the processes in these spaces.

BRIEF DESCRIPTION OF THE DRAWINGS

The present invention is described in greater detail below with reference to the figures. The same reference numerals, with or without a letter a, b, c or d, each refer to the facts.

DETAILED DESCRIPTION OF THE DRAWING

Figure 1:
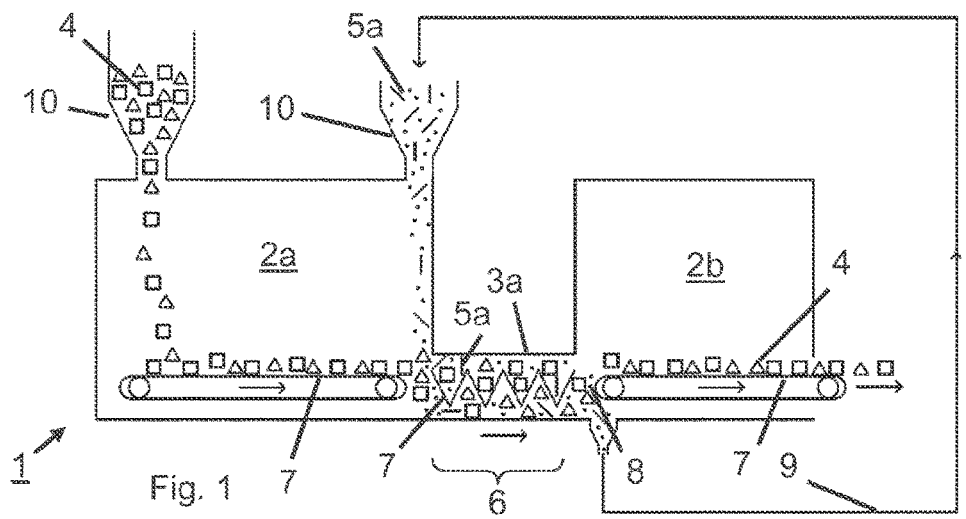
FIG. 1 shows a schematic diagram of an installation according to the invention having two spaces.

FIG. 1 shows an installation 1 according to the invention for carrying out a continuous multi-stage industrial process in the simplest form. It comprises a first space 2a and a second space 2b, wherein different process conditions, in particular different pressures, prevail in these spaces 2a, 2b during the course of the process. For example, one of the spaces may also be open to the surroundings. These two spaces 2a, 2b are interconnected by a first connecting channel 3a. In a process sequence, a process material 4 may pass through the first space 2a, the first connecting channel 3a and the second space 2b, one after the other. According to the invention, a transported material 5a is provided in the first connecting channel 3a, in which or with which the process material 4 can pass through the first connecting channel 3a in a process sequence. The transported material 5a together with the process material 4 forms a free-flowing sealing zone 6 in the connecting channel 3a, which ensures that the different process conditions, in particular the pressure differences in the two spaces 2a, 2b, will be maintained. During the process, this mixture of transported material 5a and process material 4 trickles steadily through the sealing zone.

This invention is of course not limited to two spaces 2a, 2b with a connecting channel 3a. Ambient conditions may therefore also prevail in many of the spaces 2, which may also be open in particular.

The process conditions in the two spaces 2a, 2b may be different from one another, for example, in their temperature, their moisture content, their gas composition and/or their radiation burden, not to mention the pressure differences prevailing there.

According to the invention, the passage through the installation 1 between the two spaces 2a, 2b is free of airlocks, so that a continuous industrial process can be carried out, in which there is no apportioning in the meantime and thus the process need not be interrupted. The process material 4 can pass continuously through the installation 1 without having to stop in the meantime. This simplifies the process because discontinuities in a process are often responsible for problems.

In particular one or more transport means 7, which ensure continuous passage of the process material 4 and also the transported material 5a, may be provided. The process material 4 may be transported with these transport means 7 either alone or combined with the transported material 5a. A worm gear, a conveyor belt, a trickle system and/or a pump in particular may be used as transport means 7. The deciding factor here is that free-flowing material can be transported.

The process material 4 may be any substance, which should be capable of passing through the processes. Examples of suitable processes including drying, moistening, condensation, distillation, pigmentation, spraying, irradiation, heating, cooling, adsorption, reception and/or mixing or separation, isolation and introduction into the installation 1 or discharge from the installation 1 when different process conditions, in particular different pressures, prevail in the surroundings than in the adjacent spaces 2. This is not a final list.

However, the process material 4 may also be a wet material which is mixed with a dry transported material 5 in a space 2 so that together they become free-flowing, In the context of the present invention, free-flowing means that the mixture is a gas-permeable bulk material, which is divided into portions when poured. Liquids and pasty materials are not gas-permeable and therefore are not free-flowing in the sense of the invention. A process material 4 that was originally pasty or liquid must therefore be combined with a suitable amount of dry transported material 5 in order to become free-flowing. On the other hand, a dry process material 4 can be combined with a transported material 5a, which is itself a free-flowing material, a pasty composition or a liquid. It is important for the mixture of process material 4 and transported material 5 in the connecting channel 3a to be free-flowing. If the mixture is too wet, it will endanger the transport through the connecting channel 3a because the composition will stick to the walls and result in blockages. A liquid mixture of process material 4 and transported material 5 is also not free-flowing and therefore is not taken into account here.

In particular the transported material 5a used in the plant 1 may be the same as the process material 4. In this case, the process material 4 is used only in the connecting channel, which forms the sealing zone. In addition, the only difference between the process material 4 and the transported material 5 may be the moisture content. A wet material may thus be combined with a dry substance, which corresponds to the dried wet material. The wet material therefore becomes drier due to the materials being combined, thereby achieving the desired pourability, which is required for the industrial process.

For example, sand is a free-flowing material which is gas-permeable: moisture can escape from a small pile of sand until it is completely dry. Furthermore, sand or similar granules with a grain size diameter of approximately 0.5-3 mm is a suitable transported material 5a because it has a sufficient imperviousness in a sealing length of less than one meter for most process conditions, in particular for differences in pressure.

Figure 2:
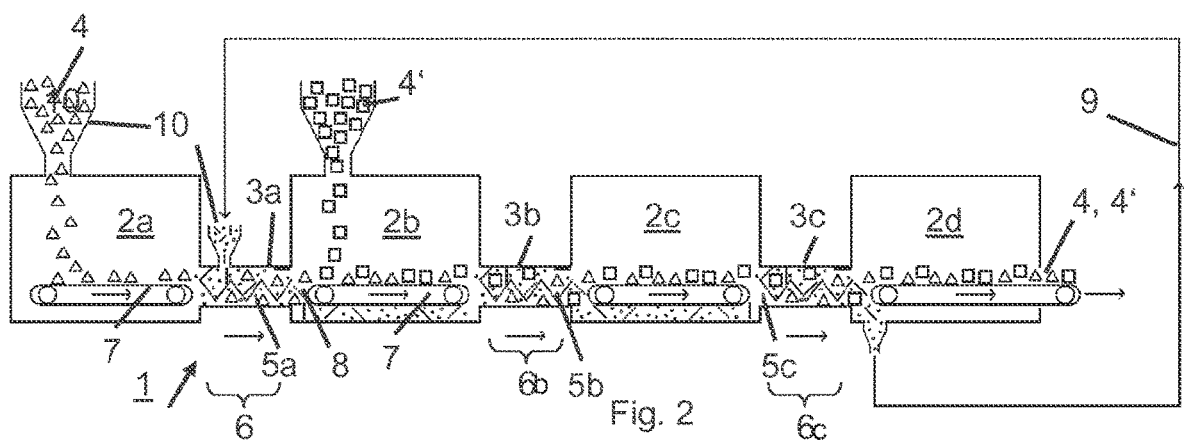
FIG. 2 shows a schematic diagram of an installation according to the invention having four spaces.

The installation 1 preferably includes a separation device 8 in the second space 2b for separating the transported material 5a from the process material 4. As schematically shown in FIGS. 1 and 2, typical separation devices in this context include filters, which separate the material based on the relative volumes occupied by the particles, and gravity separation devices that separate the material based on the relative densities of the particles. In addition, a return device 9 may be arranged therein for recycling the transported material 5a, which is either brought directly into the first connecting channel 3a or brought only into the first space 2a, from which it ultimately goes back into the connecting channel 3 and forms the sealing zone with new process material 4. As schematically shown in FIGS. 1 and 2, a typical return device 9 includes a conduit that carries the transported material 5a back to the supply device 10.

As shown in FIG. 2, the installation 1 may also comprise one or more additional spaces 2c, 2d with individual process conditions, wherein all the spaces 2a, 2b, 2c, 2d are interconnected directly or indirectly through a suitable number of additional connecting channels 3b, 3c. In each additional connecting channel 3b, 3c a transported material 5b, 5c together with the process material 4 forms a free-flowing sealing zone 6b, 6c, which ensures that the different process conditions will be upheld, in particular pressure differences in the spaces 2b, 2c, 2d adjacent to the other connecting channels 3b, 3c, in accordance with the first connecting channel 3a. Identical and/or different free-flowing materials 5a, 5b, 5c may be arranged in the connecting channels 3a, 3b, 3c. Accordingly, if all the free-flowing materials 5a, 5b, 5c are identical, they pass together with the process material 4 through all the connecting channels 3a, 3b, 3c with the process material 4 as a trickle flow. To do so, corresponding separation devices may be present to separate the process material 4 from the respective transported material 5a, 5b, 5c in each space 2b, 2c, 2d. Supply devices 10 may also be arranged there, combining the transported material 5a, 5b that has been separated with the process material 4 as the next transported material 5b, 5c before the next connecting channel 3b, 3c.

In particular, additional devices or supply devices 10 may also be provided for introducing additional process goods 4' into one of the spaces 2, as illustrated in FIG. 2. Further the various process materials 4, 4' may each have passed through one or more spaces 2 with corresponding processes before being combined and then running through additional spaces jointly. However, that is not shown here.

Figures 3A, 3B:
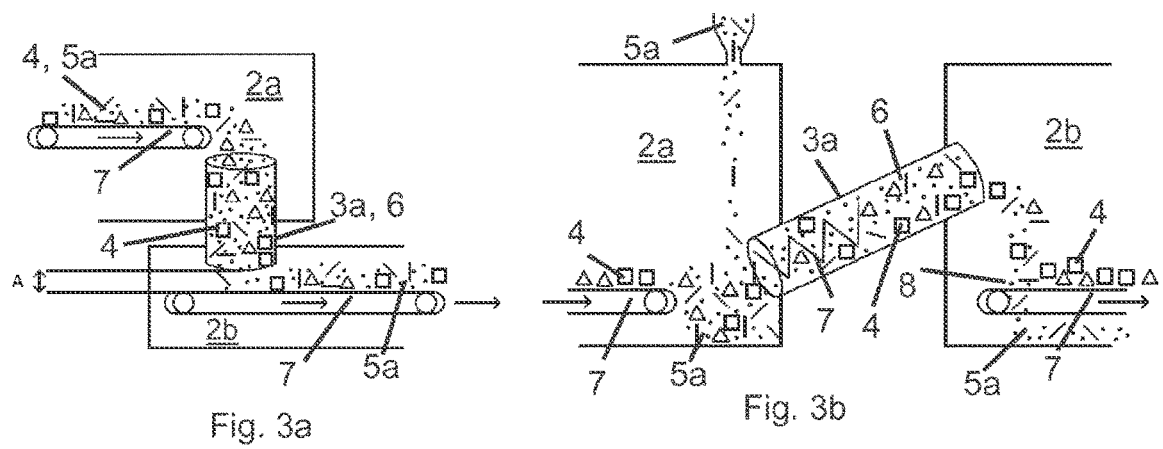
FIG. 3a shows a schematic diagram of a connecting channel of an installation according to the invention between two spaces.
FIG. 3b shows an alternative schematic diagram of a connecting channel of an installation according to the invention between two spaces.

FIG. 3a shows one possible example of a connecting channel 3a according to the invention, which connects two spaces 2a, 2b. The connecting channel 3 comprises a cylinder that is open at both ends and is positioned vertically, terminating on each side in one of the spaces 2a, 2b, which do not otherwise have any direct connection to one another. The spaces are separated from one another in a pressure-tight manner, wherein the pressure difference in the spaces (2a, 2b) is at least 0.2 bar, at least 0.8 bar or at least 2 bar. Accordingly, the required minimum length of the connecting channel 3 also varies. At least one of the spaces 2a, 2b must be separated in a pressure-tight manner from the surroundings, depending on the requirements of the pressure difference. This means that both the inlet and the outlet for the process material 4 and for the transported material 5a must be leakproof during use. Both of these effects can be achieved according to the invention by a connecting channel 3 as a free-flowing sealing zone 6. In particular the supply devices may also be designed to be leakproof during use. If the process material 4 and/or the transported material 5a itself is/are not free-flowing but instead is/are liquid or pasty, then other known leakproof inlet and/or outlet devices would also be available from the state of the art.

In FIG. 3a, the mixture with process material 4 and transported material 5a in the space 2a is conveyed continuously with transport means 7, for example, with a conveyor belt or a conveyor worm gear, into the cylindrical connecting channel 3a. The space 2b contains another transport means 7, for example, another conveyor belt, close to but at a distance from the pipe opening, onto which process material 4 and transported material 5a trickle out of the connecting channel 3a during the process. The distance A between the transport means 7 and the lower opening of the connecting channel 3a is such that the mixture of process material 4 and transported material 5a comes to a standstill and no longer trickles as soon as the lower transport means 7 has stopped in the space 2b, as shown in FIG. 3a. The rate of travel of the transport means 7 together with the aforementioned distance A thus determines the flow rate in the installation 1. The resupply into the connecting channel 3a should thus be regulated so that the filling level therein is always in a predetermined range. This ensures that the imperviousness that is provided between the spaces 2a and 2b always meets the desired criteria.

The trickle principle corresponds here to that of a bird feed dispenser. The bird feed backs up in the dish as long as the supply there is filled to a sufficient level. However, as soon as the grains have been picked out, they trickle out again from the bird feed supply, but without overfilling the dish. It can be seen that this principle would not function with either a pasty filling or a liquid filling. Therefore, a trickling mixture is required as the filling in the sealing zone 6 in the installation 1 according to the invention.

In addition, the sealing zone must have a sufficient length for the required pressure tightness to be ensured. The required length depends on the pressure difference, the average diameter of the granules and the cross-sectional area of the connecting channel 3.

The aforementioned example according to FIGS. 3a and 3b can of course be generalized without any loss of validity. Thus, the connecting channel 3b need not necessarily be set up vertically but may also be arranged at an inclination to the direction of fall. Furthermore, the cross section of the connection channel 3a may not be round but instead may have any desired shape, such as rectangular, and the shape also need not be constant. Instead of the nearby transport means 7 preventing the material from trickling freely out of the connecting channel 3a, a funnel may also be mounted at the lower opening of the connecting channel 3a, wherein the setting of the funnel opening regulates the amount of flow-through. A minimum size must then be maintained accordingly for the distance from the transport means. However, the advantage of the nearby conveyor belt is that the installation 1 can be stopped and started up again at any time without having to open and close a device. A funnel would allow the connecting channel 3a to empty too slowly in the event of a stoppage of the process if the funnel opening were not closed.

Furthermore, as shown in FIG. 3b the connecting channel 3a may also be filled from the bottom, in particular when it is arranged at an angle to the direction of fall. The mixture of process material 4 and transported material 5a is then preferably conveyed partially upward at least in part with transport means 7, for example, with a continuous conveyor belt, a conveyor worm gear or a spiral conveyor, where it ultimately trickles out of the connecting channel 3a. This is readily possible in particular when the specific gravity of the process material 4 is higher than that of the transported material 5a because it is then certain that no process material 4 can remain in the upper part of the connecting channel 3a. In this case, a large portion of the transported material 5a would remain permanently in the connecting channel 3a and only a smaller portion of the transported material 5a would reach the upper end of the connecting channel 3a. Thus, the process material 4 flows mostly in the transported material 5a but less with it. The pressure tightness in the sealing zone 6 however, is always maintained.

It has been found that even transported material 5a, which contains essentially open gas channels, can provide a sufficient seal and can thus form a sufficient sealing zone 6, when a corresponding filling height and/or filling length is/are provided.

The method according to the invention is a continuous multi-stage industrial process, which is carried out on an installation 1 according to the invention. A continuous process material 4 is introduced into the first space 2a with the first process conditions, where it is put through a first process. The process material 4 then passes through the first connecting channel 3a in or together with the transported material 5a and enters the second space 2b with the second process conditions and in particular with different pressure conditions than in space 2a, where it is subjected to a second process. It is ultimately removed from this space by being introduced into another connecting channel 3b, for example. The transported material 5a together with the process material 4 forms a trickling sealing zone 6 at all times in the connecting channel 3a, which ensures that the different process conditions will be maintained and in particular ensures different pressures in the two spaces 2a, 2b.

The process material 4 may in particular then pass through one or more additional connecting channels 3b, 3c and spaces 2c, 2d at separate process conditions in alternation. The transported material 5b, 5c and the process material 4 together form a trickling zone 6b, 6c in each additional connecting channel 3b, 3c, thereby ensuring that the different process conditions will be maintained and that the different pressure differences in the spaces 2b, 2c, 2d adjacent to the additional connecting channel 3b, 3c will be maintained.

According to the invention, the process material 4 in the spaces 2a 2b, 2c, 2d is put through two or more processes. A process may be a drying, a moistening, a condensation, a distillation, a pigmentation, a spraying, an irradiation, a gas composition, a chemical reaction, an inertization of substances, a heating, a cooling, an adsorption, a reception and/or a mixture or separation in particular.

REFERENCE LIST 1 installation
2 2a, 2b, 2c, 2d space
3 3a, 3b, 3c connecting channel
4 process material
5 5a, 5b, 5c transported material
6 6b, 6c sealing zone
7 transport means
8 separation device
9 return device
10 supply device
A distance

The invention claimed is:

1. An installation for carrying out a continuous multi-stage industrial process that carries out at least two successive stages of the process under a different pressure in an earlier stage than in a later stage, which is downstream from the earlier stage, the installation comprising:
a first chamber defining a first space and comprising a first wall;
a second chamber, disposed spaced apart downstream from the first chamber and separately from the first chamber, the second chamber defining a second space and comprising a second wall, wherein the second space excludes the first space; and
a first connecting channel forming a pressure tight connection between the first chamber and the second chamber, the first connecting channel comprising a wall in a direction of travel from the first chamber to the second chamber, the wall forming a pressure tight, enclosed channel between the first chamber and the second chamber,
wherein the first connecting channel elongates between a first end and a second end disposed downstream from the first end,
wherein the first connecting channel is open at the first end and at the second end and is otherwise pressure tight and sealed against leakage through the wall of the first connecting channel, and
wherein the first connecting channel contains a free-flowing intermixed material comprising process material and granular transport material that are intermixed in relative proportions sufficient to form a granular, free-flowing and trickling mixture that is passing through the first connecting channel from the first space and into the second space to form a trickling sealing zone within the first connecting channel to maintain a pressure difference between the first space and the second space.

2. The installation according to claim 1, wherein the first connecting channel is free of any airlock.

3. The installation according to claim 1, further comprising a transport means configured for ensuring the passage of the process material through the first connecting channel, wherein the transport means is selected from the group of: a worm gear, a conveyor belt, a conveyor worm gear, a trickle installation or a pump.

4. The installation according to claim 1, wherein the process material comprises a loose, bulk material, a pasty material or a liquid.

5. The installation according to claim 1, further comprising a separation device in the second space for separating the free-flowing intermixed material from the process material.

6. The installation according to claim 5, further comprising a return device for returning the free-flowing intermixed material back to the first connecting channel.

7. The installation according to claim 1, wherein the transport material is the same as the process material.

8. The installation according to claim 1, wherein the process conditions in the two spaces are also different with regard to their temperature, moisture content, gas composition and/or the radiation burden in the spaces, apart from the different pressures.

9. The installation according to claim 1, further comprising:
a third chamber defining a third space;
a second connecting channel connecting the second chamber to the third chamber;
a fourth chamber defining a fourth space; and
a third connecting channel connecting the third chamber to the fourth chamber,
wherein the free-flowing intermixed material forms a free-flowing trickling sealing zone in each connecting channel, this sealing zone ensuring that different pressures will be maintained in the respective spaces adjacent to respective connecting channels.

10. The installation according to claim 1, wherein one of the chambers is connected to the atmosphere and accordingly subject to atmospheric pressure.

11. The installation according to claim 1, wherein the pressure difference between the first space and the second space is at least 0.2 bar.

12. The installation according to claim 1, wherein the pressure difference between the first space and the second space is at least 0.8 bar.

13. The installation according to claim 1, wherein the pressure difference between the first space and the second space is at least 2.0 bar.

14. The installation according to claim 1, further comprising:
transport means located within and ending within the first chamber, the transport means configured to deliver at least the process material to a location near to the first end of the first connecting channel;

a first supply device introducing the process material into the first chamber so as to deposit the process material at a first location of the transport means; and a second supply device introducing the granular transport material into the first chamber so as to deposit the transport material at a second location of the transport means or near the first end of the first connecting channel such that the free-flowing intermixed transport material and process material fills the first end of the first connecting channel as intermixed free-flowing trickling granular material.

15. The installation according to claim 1, further comprising a transport means that urges the intermixed free flowing trickling granular material to pass through the first connecting channel from the first space to the second space, the transport means comprising one of:

the first connecting channel being in a downwards position, having the first end in a high position and the second end in a low position relative to the first end, so that gravity urges the free-flowing intermixed material through the first connecting channel; or a spiral conveyer fully within the first connecting channel that begins and ends within the first connecting channel.

16. The installation according to claim 1, wherein a first process condition prevails in the first chamber and a second process condition prevails in the second chamber to perform a second process, where at least one of the first process and the second process comprises one of a drying, a moistening, a condensation, a distillation, a pigmentation, a spraying, an irradiation, a gas composition, a chemical reaction, an inertization of substances, a heating, a cooling, an adsorption, a reception, a mixing or a separation.

17. The installation of claim 1, wherein the first connecting channel contains discrete granular particles of a free-flowing, transport material that are intermixed with the discrete granular particles of the process material in the first chamber prior to entering the first connecting channel.

18. A method for carrying out a continuous multi-stage industrial process that carries out at least two successive stages of the process under a different pressure in an earlier stage than in a later stage, which is downstream from the earlier stage, the method comprising:

intermixing a transport material and a process material in a first chamber; and allowing passage of a free flowing intermixed material comprising process material and transport material from the first chamber into a second chamber via a first connecting channel comprising a pressure tight connection between the first chamber and a second chamber, the first connecting channel comprising a wall connected with respective pressure tight seals to a first wall of the first chamber and a second wall of the second chamber to form a pressure tight, enclosed channel between the first chamber and the second chamber, wherein the first connecting channel elongates between a first end and a second end disposed downstream from the first end, wherein the first connecting channel is open at the first end and at the second end and otherwise pressure tight and sealed against leakage through the first connecting channel;

wherein a hollow interior space defined by the first connecting channel contains discrete granular particles of a free-flowing transport material that are intermixed prior to entering the first connecting channel with the discrete granular particles of the process material in relative proportions sufficient to form a trickling sealing zone within the first connecting channel to maintain a pressure difference between the first chamber and the second chamber.

* * * * *